April 7, 1936. G. H. MEINZER 2,036,949
ELECTRODE SYSTEM FOR PRODUCING SOLUTIONS OF METALS
Filed July 1, 1935

INVENTOR.
GOTTHOLD HARRY MEINZER
BY
ATTORNEY.

Patented Apr. 7, 1936

2,036,949

UNITED STATES PATENT OFFICE 2,036,949

ELECTRODE SYSTEM FOR PRODUCING SOLUTIONS OF METALS

Gotthold Harry Meinzer, Glendale, Calif., assignor to California Consumers Corporation, Los Angeles, Calif., a corporation of California Application July 1, 1935, Serial No. 29,419

1 Claim. (Cl. 204—1)

The object of my invention is to produce extremely dilute solutions of certain metals, such as silver and copper, in water or in aqueous liquids.

An object of my invention is to provide an electrode combination adapted to the use of an alternating or sine wave current for increasing the rate of solution of the metal.

An object of my invention is to provide means for simultaneously applying to the liquid a sine wave current and a pulsating direct current, thereby realizing the advantages inherent in the use of each and avoiding the necessity for providing a supply of unidirectional current.

Figure 1:
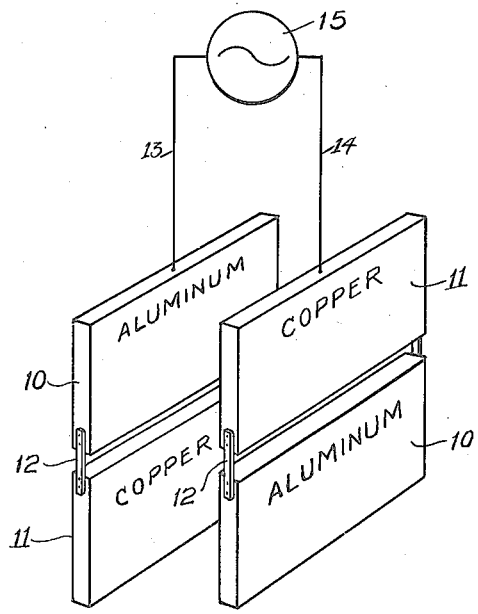
Figure 2:
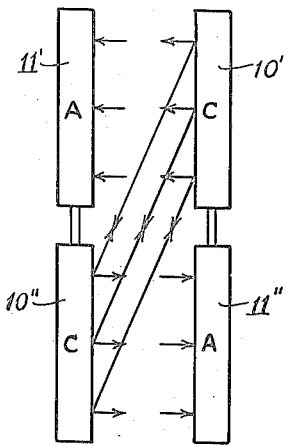
Figure 3:
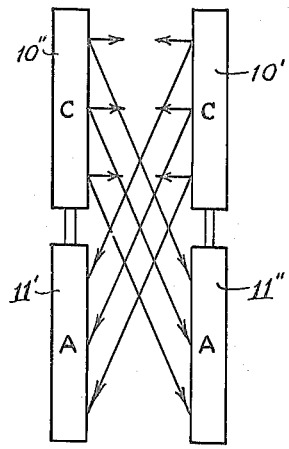

In the attached drawing, Fig. 1 illustrates the structure of the electrode combination and the manner in which it is connected, and Figs. 2 and 3 are diagrams illustrating the flow of current between the electrodes.

Referring first to Fig. 1, 10—10 are plates of aluminum and 11—11 are plates of the metal to be dissolved, for example copper. These plates are electrically connected in dissimilar pairs, as by the straps 12—12 and the pairs are respectively connected by the leads 13 and 14 to a source of sine wave current, as for example the induction generator indicated by the symbol 15. The electrode are immersed in the liquid in which the metal is to be dissolved, in any convenient manner.

It is known that an oxidized aluminum surface connected as an electrode in an electrolytic cell acts as a rectifier for a sine wave current. This valve action is explained by the fact that the oxide-coated aluminum electrode shows an abnormally high anode polarization potential, hence negative ions are not discharged at such an anode at normal electrolytic voltages, up to as high as 500 volts under certain conditions. The cathode polarization potential of such an electrode is normal, hence positive ions are discharged at normal electrolytic voltages. It follows that an electrolytic current can flow in such a cell only when the oxide-coated aluminum electrode is the cathode.

Assuming an alternating potential to be impressed on a pair of electrodes immersed in a conductive liquid, one of these electrodes being of copper or silver and the other of coated aluminum, it will be seen that during the half of the sine wave by which the aluminum electrode is charged positively, no current can flow between the electrodes, while during the half wave by which the aluminum electrode is charged negatively, current is freely transmitted through the liquid to the aluminum. Thus the positive half of the wave (as referred to the aluminum electrode) is suppressed and the result is the production of a pulsating, unidirectional current flowing from the copper to the aluminum element.

If this single pair be duplicated, as in Fig. 1, we have alternately a pulsating, unidirectional current from each of the copper plates to the opposed aluminum plate and simultaneously a bidirectional or sine wave current flowing between the opposed copper plates. The resultant effect is that the copper plates function alone as anodes while both copper and aluminum plates function as cathodes, from which it follows that the current density at the surface of either copper plate while in the anodic status is greater than the current density during the cathodic period.

The relation between the current densities transmitted from the copper plate to the liquid and from the liquid to both plates will then be the reciprocal of the liquid resistances effective during the respective halves of the cycle, which relation will vary with the arrangement and the relative spacing of the plates.

For example, in the arrangement shown in Fig. 2 in which plates of dissimilar metals are opposed, the current path from copper to aluminum, as from 10′ to 11′, is relatively short and the resistance correspondingly low, while the current path from copper to copper, as from 10′ to 10″, is relatively long and the resistance correspondingly high. With this arrangement the direct current amperage is relatively high and the sine wave amperage relatively low. If the arrangement be reversed, as in Fig. 3 in which plates of the same metal are opposed in position, the current path from copper to copper, as from 10′ to 10″, is relatively short while the current path from copper to aluminum, as from 10′ to 11′ is relatively long, thus reversing the relations between direct and alternating amperage.

The described method of bringing metals into the so-called oligodynamic solution has material advantages over the use of either direct or alternating current alone. A relatively small alternating amperage maintains the copper surfaces bright and in condition for rapid solution by preventing polarization, while the larger proportion of direct current is utilized to produce rapid solution under ideal conditions as to electrode surface.

This method is also advantageous over the simultaneous application of direct and alternating current from separate sources coupled in parallel in that it requires no apparatus other than the electrodes and the containing vessel in cases where commercial alternating current is available at the desired voltage.

I claim as my invention:

Means for dissolving oligodynamic metals in aqueous liquids comprising: a pair of electrode elements, each said element comprising a plate of said oligodynamic metal and a plate of oxide-coated aluminum, said plates being electrically connected, and means for connecting said elements to opposite poles of a source of sine wave electrical current.

GOTTHOLD HARRY MEINZER.